UNITED STATES PATENT OFFICE.

YUTAKA NUKADA, OF TOKYO, JAPAN.

PREPARATION OF PROTEID SILVER.

1,272,987.

Specification of Letters Patent. Patented July 16, 1918.

No Drawing.  Application filed September 24, 1917.  Serial No. 192,949.

*To all whom it may concern:*

Be it known that I, YUTAKA NUKADA, a subject of the Emperor of Japan, and a resident of No. 4 Hikawa-Cho, Akasaka-Ku, city of Tokyo, Empire of Japan, Physician, Dr., have invented a new and useful Improvement Relating to the Preparation of Proteid Silver, of which the following is a specification.

The present invention has reference to an improved process for preparation of proteid silver which consists in first subjecting to the action of the silver the liquid specially extracted from the natto (Japanese food an explanation of which will appear later) and subsequently precipitating it with alcohol, and has for its object to obtain in most simple manner a proteid silver that can be sold at considerably reduced price through the employment of natto which is a very cheap food stuff special to Japanese market.

My invention contemplates, as a base, the use of natto which I believe to be the food consumed by no nation other than Japanese, and, therefore, before going into any further I will now proceed to explain what this particular food is and how it is prepared:—

Natto is a name given to a peculiar sticky food-stuff obtained by first steaming or fomenting a soy-bean (haricot-bean) and preserving it in a straw wrapper for about 24 hours at a temperature of, say 30–50 degrees C., whereby a certain species of bacteria residing in the straw wrapper will be multiplied and in view of the proteolytic enzym thrown by this thriving bacteria an insoluble proteid contained in the beans is decomposed thereby transforming the latter to a peculiar sticky mass of soluble proteids.

My process which is simple is as follows:—

As an essential base of an invention I take approximately 13.5 kilograms of natto to which is added about 55 liters of water, and boiled for about six hours at a temperature of 100 degrees C. so as to extract soluble proteids thereof, which is then filtered.

From the filtrate is evaporated a containing water by subjecting it to water bath treatment so as to concentrate it into the volume of 9 liters, which is allowed to stand for 12 hours after which the precipitate is removed and filtered through filter paper.

To one cubic meter of the liquid thus obtained is added 17.5 grams silver nitrate and stirred until the silver is combined with proteids. To this mixture is then added about 40 cubic centimeters of alkali, subsequent to which it is subjected to a temperature of approximately 50 degrees C. This will produce a very clear liquid which precipitates by adding to it about 6 meters of alcohol, then sugaring the precipitant, which is crushed to powder by removing the alcohol and subsequently drying in a vacuum heater. The above process will produce proteid silver in which about 8.3% of silver is contained.

It will be observed that the gist of the present invention resides in this feature of employing cheap material for the base, the natto.

What I claim as my invention, and desire to secure by Letters Patent, is—

1. A preparation of proteid silver which consists in adding silver nitrate to the liquid extracted from natto in the ratio of approximately one gram of silver nitrate to each one and one-half to two pounds of natto.

2. A preparation of proteid silver which consists in adding 17.5 grams of silver nitrate into the liquid extracted from natto, which liquid is produced by taking approximately 30 pounds of natto and adding the same to 12 gallons of water, which is heated for about 6 hours at a temperature of 100° C., then filtered and heated in water bath until the solution has evaporated to 9 cubic meters in volume, upon which it is allowed to stand 12 hours and then removing the precipitate by filtering through filter paper.

In testimony whereof I affix my signature in presence of two witnesses.

YUTAKA NUKADA.

Witnesses:
 H. F. HAWLEY,
 HASUTADA YASAMASA.

Copies of this patent may be obtained for five cents each, by addressing the "Commissioner of Patents, Washington, D. C."